United States Patent
Hirukawa et al.

(10) Patent No.: US 9,169,812 B2
(45) Date of Patent: Oct. 27, 2015

(54) VEHICULAR ENGINE ASSEMBLY HAVING SNORKEL AND VEHICLE INCLUDING SAME

(71) Applicant: Honda Motor Co., Ltd., Tokyo (JP)

(72) Inventors: Masayuki Hirukawa, Dublin, OH (US); Eric Douglas Moseley, Columbus, OH (US); Yoshiyuki Sato, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 277 days.

(21) Appl. No.: 13/649,653

(22) Filed: Oct. 11, 2012

(65) Prior Publication Data

US 2014/0102818 A1   Apr. 17, 2014

(51) Int. Cl.
*B60K 13/02* (2006.01)
*F16L 3/00* (2006.01)
*B60K 5/00* (2006.01)
*F02M 35/10* (2006.01)
*F02M 35/16* (2006.01)

(52) U.S. Cl.
CPC ....... *F02M 35/10013* (2013.01); *F02M 35/162* (2013.01); *B60K 13/02* (2013.01); *B60Y 2200/12* (2013.01); *B60Y 2410/114* (2013.01); *Y10T 137/6851* (2015.04)

(58) Field of Classification Search
CPC ............ B60K 13/02; F02M 35/10013; F02M 35/162; F02M 31/042; F02M 31/07; F02M 31/10; F02M 35/0203; F02M 35/021; F02M 35/022; F02M 35/0245; F02M 35/02483; F02M 35/1255; F02M 35/14; B01D 2265/028; B01D 2275/201; B01D 2279/60; B01D 46/2411; B01D 46/521; B01R 16/015; Y10T 137/6851; B60Y 2200/12; B60Y 2410/114

USPC ......................................... 180/291, 68.1, 68.3
See application file for complete search history.

(56) References Cited

U.S. PATENT DOCUMENTS

| | | | | |
|---|---|---|---|---|
| 3,677,240 | A * | 7/1972 | Sarto | 123/572 |
| 4,591,202 | A * | 5/1986 | Burk et al. | 296/203.02 |
| 4,785,686 | A * | 11/1988 | Thomas | 74/502.4 |
| 4,878,555 | A * | 11/1989 | Yasunaga et al. | 180/68.3 |
| 5,106,397 | A * | 4/1992 | Jaroszczyk et al. | 96/388 |
| 5,195,484 | A * | 3/1993 | Knapp | 123/198 E |
| D353,383 | S * | 12/1994 | Aronsson et al. | D15/5 |
| 5,399,812 | A * | 3/1995 | Woszczyna et al. | 174/97 |
| 6,102,012 | A * | 8/2000 | Iiboshi et al. | 123/556 |
| 6,314,931 | B1 * | 11/2001 | Yasuda et al. | 123/184.53 |
| 6,920,949 | B2 | 7/2005 | Matsuura et al. | |
| 7,370,625 | B2 | 5/2008 | Hanafusa | |
| 7,469,762 | B2 * | 12/2008 | Kim | 180/68.1 |
| 8,181,728 | B2 * | 5/2012 | Hartland et al. | 180/68.3 |
| 2009/0242312 | A1 | 10/2009 | Oshima et al. | |
| 2012/0073539 | A1 * | 3/2012 | Lee | 123/198 E |

* cited by examiner

*Primary Examiner* — Bridget Avery
(74) *Attorney, Agent, or Firm* — Ulmer & Berne LLP

(57) ABSTRACT

A vehicular engine assembly includes an engine, a panel, and a snorkel. The panel is associated with the engine and includes a panel surface, a first side wall, and a second side wall. The first and second side walls extend substantially upwardly from the panel surface and define a channel. The channel is configured to receive an elongated member. The snorkel includes an attachment tab having a leg member and a foot portion. The foot portion is adjacent to and overlies at least a portion of each of the first and second side walls. The foot portion cooperates with the first and second side walls to constrain the elongated member within the channel.

20 Claims, 5 Drawing Sheets

VEHICULAR ENGINE ASSEMBLY HAVING SNORKEL AND VEHICLE INCLUDING SAME

TECHNICAL FIELD

A vehicular engine assembly includes an engine and a panel associated with the engine. The panel has a first side wall and a second side wall that cooperate to define a channel. A snorkel is associated with the engine and includes a foot portion that is configured to cooperate with the first and second side walls to constrain an elongated member within the channel.

BACKGROUND

Many conventional vehicles, such as saddle-type vehicles, include an engine which is positioned upon the vehicle and configured to power the vehicle. Conventionally, cables that are routed near the engine are sometimes coupled to locations around the engine in a manner that can chafe the cables and can result in premature cable failure.

SUMMARY

In accordance with one embodiment, a vehicular engine assembly comprises an engine, a panel, and a snorkel. The panel is associated with the engine and includes a panel surface, a first side wall, and a second side wall. The first and second side walls extend substantially upwardly from the panel surface and define a channel that is configured to receive an elongated member. The snorkel includes an attachment tab having a leg member and a foot portion. The foot portion is adjacent to and overlies at least a portion of each of the first and second side walls. The foot portion cooperates with the first and second side walls to at least partially constrain an elongated member within the channel.

In accordance with another embodiment, a vehicle comprises a frame, an engine, at least two wheels, a panel, an elongated member, and a snorkel. The engine is substantially supported by the frame. The at least two wheels are rotatably coupled to the frame. The panel is associated with the engine and comprises a panel surface, a first side wall, and a second side wall. The first and second side walls extend substantially upwardly from the panel surface and define a channel. The elongated member is routed between the first and second side walls with at least a portion of the elongated member disposed within the channel. The snorkel comprises an attachment tab. The attachment tab comprises a foot portion. The foot portion is adjacent to and overlies at least a portion of each of the first and second side walls. The foot portion cooperates with the first and second side walls to at least partially constrain the elongated member within the channel.

In accordance with yet another embodiment, a saddle-type vehicle comprises a frame, an engine, at least two wheels, a panel, a cable, and a snorkel. The engine is substantially supported by the frame. The at least two wheels are rotatably coupled to the frame. The panel is associated with the engine and comprises a panel surface, a first side wall, and a second side wall. The first and second side walls extend substantially upwardly from the panel surface and define a channel. The cable is routed between the first and second side walls and is at least partially disposed within the channel. The snorkel comprises an attachment tab having a leg member and a foot portion. The foot portion contacts and overlies at least a portion of each of the first and second side walls such that the foot portion cooperates with the first and second side walls to at least partially constrain the cable within the channel. The first and second side walls cooperate to define a channel width. The foot portion has a width greater than the channel width. The leg member has a leg surface. The foot portion has an upper surface. The foot portion extends from the leg member such that the leg surface and the upper surface form an obtuse angle.

BRIEF DESCRIPTION OF THE DRAWINGS

It is believed that certain embodiments will be better understood from the following description taken in conjunction with the accompanying drawings in which.

DETAILED DESCRIPTION

Figure 1:
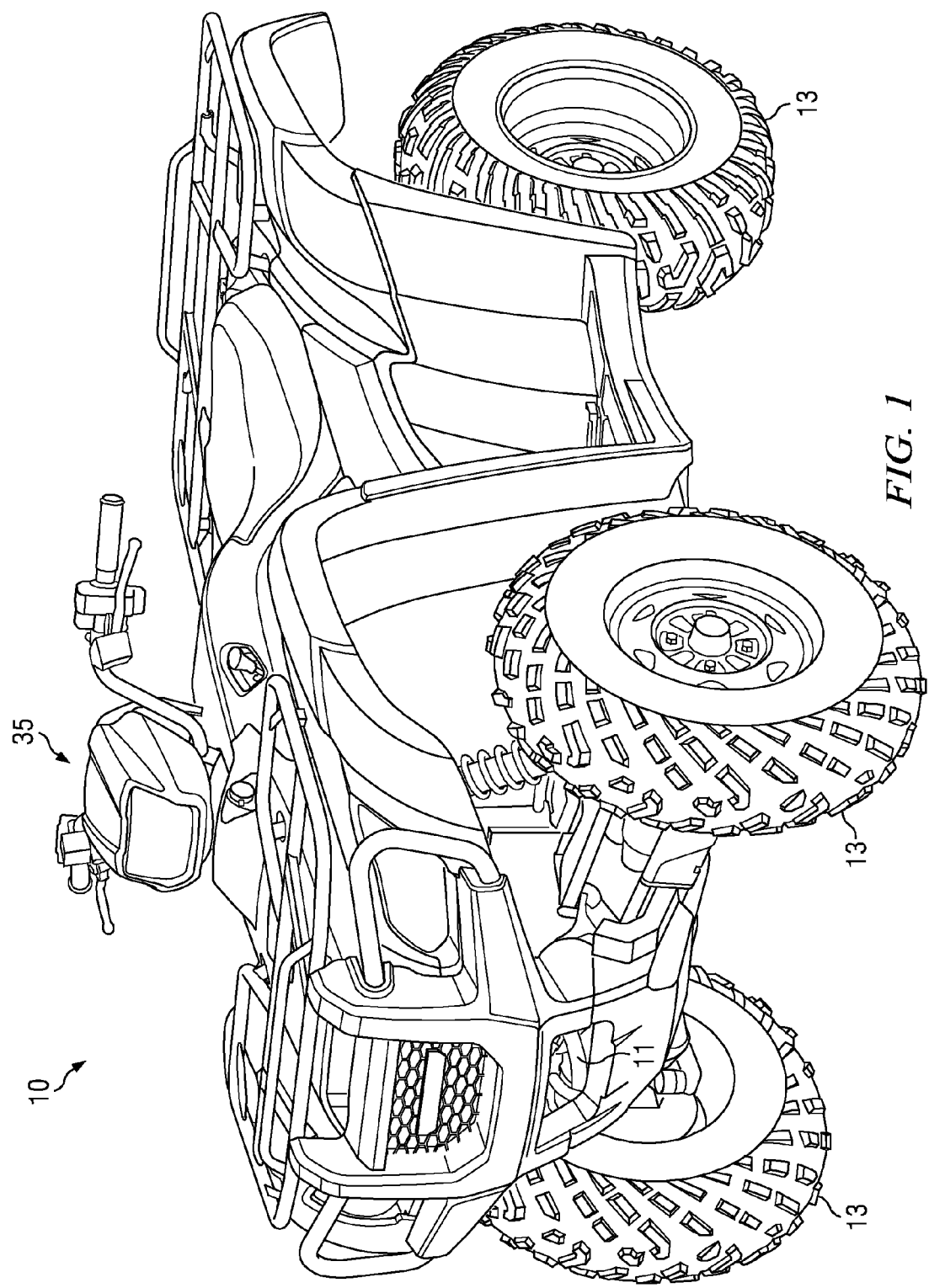
FIG. 1 is a front perspective view of a vehicle in accordance with one embodiment.

Embodiments are hereinafter described in detail in connection with the views and examples of FIGS. 1-5, wherein like numbers indicate the same or corresponding elements throughout the views. A vehicle can include a vehicular engine assembly having an engine and an intake assembly that is in fluid communication with the engine. A vehicle 10 is illustrated in FIG. 1 and is depicted as a saddle-type vehicle. A saddle-type vehicle can comprise an all-terrain vehicle ("ATV") or a motorcycle, and other suitable vehicles might comprise, for example, an automobile, a truck, a van, a scooter, a recreational vehicle, a watercraft, an aircraft, agricultural equipment, construction equipment, a toy, a mower, or any of a variety of other vehicles. The vehicle 10 can include a frame 11 that can be of a tubular construction or can be provided in any of a variety of other suitable arrangements, such as a unibody construction, for example, and can be formed using any of a variety of materials, such as a metal or carbon fiber, for example. As illustrated in FIG. 1, a plurality of wheels 13 can be rotatably coupled to the frame 11.

Figure 2:
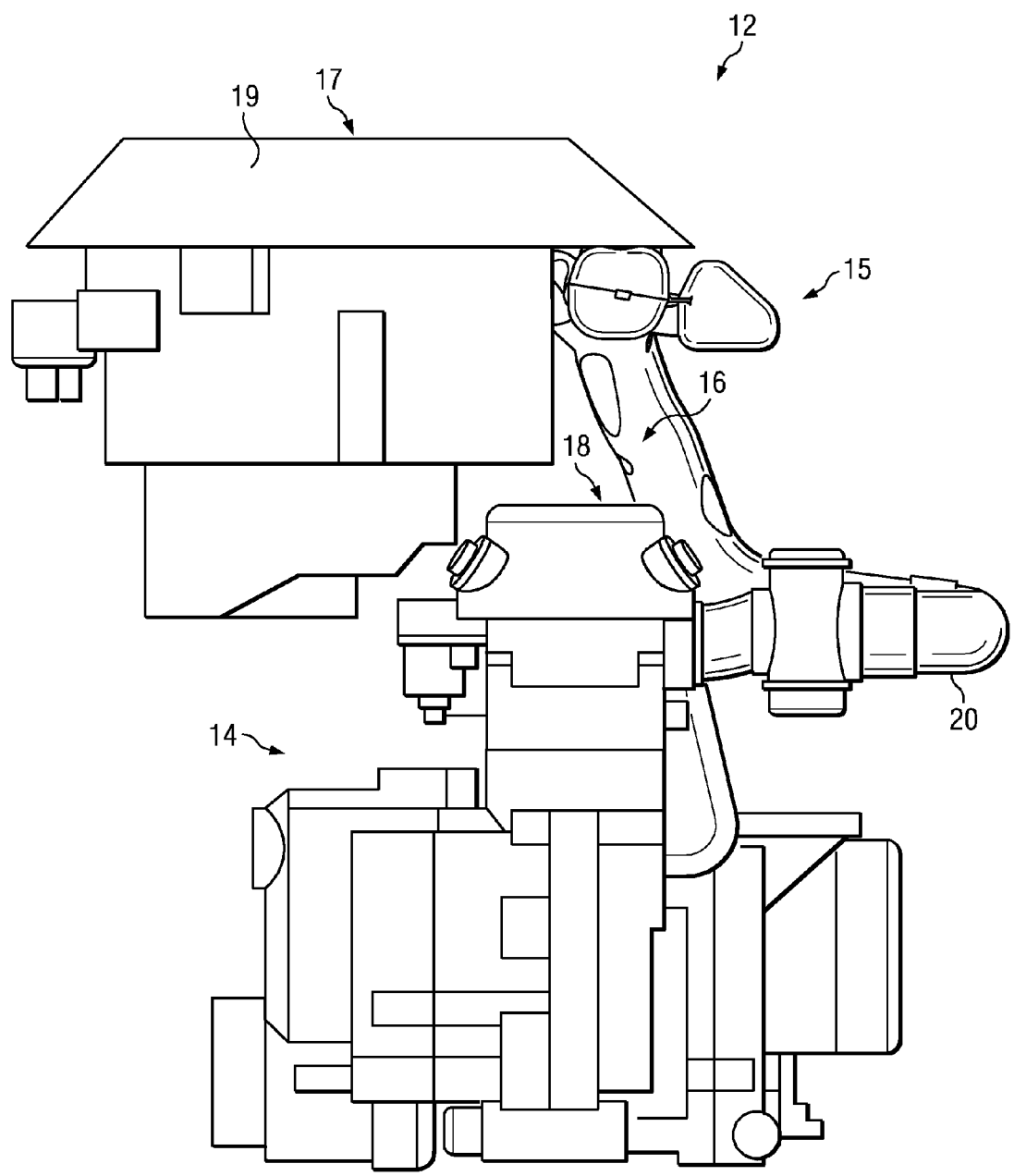
FIG. 2 is a side view depicting a vehicular engine assembly of the vehicle of FIG. 1 shown apart from the rest of the vehicle and including a lid, an engine, and a snorkel, in accordance with one embodiment.

As illustrated in FIG. 2, the vehicle 10 can include a vehicular engine assembly 12 that is supported by the frame 11. The vehicular engine assembly 12 can include an engine 14 and an intake assembly 15. The intake assembly 15 can include a snorkel 16 and an air box 17. The snorkel 16 can be in fluid communication at one end with the air box 17 and at another end with an intake manifold 18 of the engine 14. The air box 17 can be configured to receive ambient air which can be routed through the snorkel 16 and into the intake manifold 18 to facilitate combustion of fuel within the engine 14. An air filter (not shown) can be provided within the air box 17 to filter the ambient air provided to the snorkel 16. The air box 17 can include a lid 19 that is held in place with releasable fasteners (e.g., clips) and is removable to facilitate servicing and/or replacement of the air filter.

Figure 3:
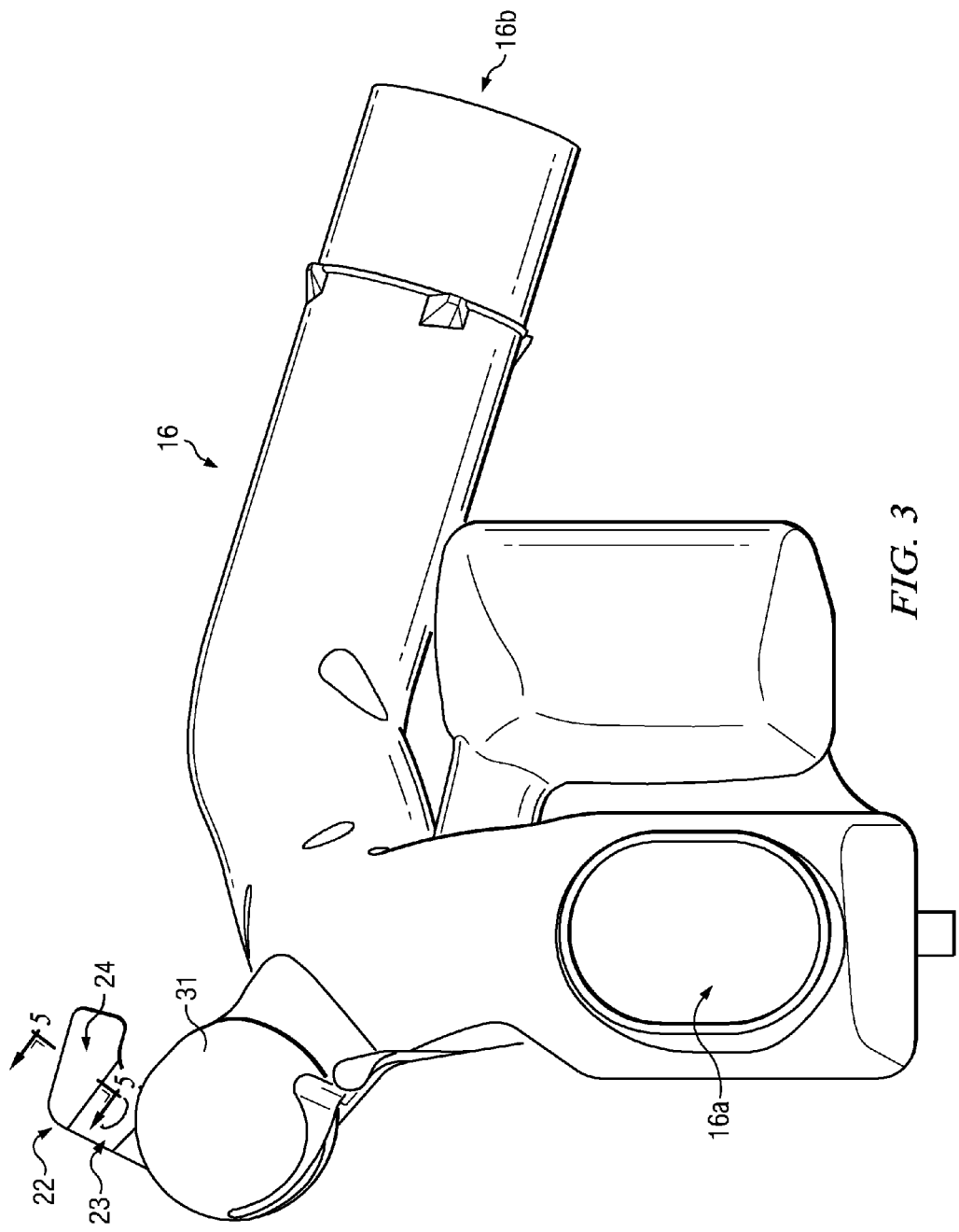
FIG. 3 is an upper perspective view depicting the snorkel of FIG. 2 shown apart from the rest of the vehicle engine assembly.

As illustrated in FIG. 3, the snorkel 16 can include an inlet port 16a and an outlet port 16b. The inlet port 16a can be in fluid communication with the air box 17 and the outlet port 16b can be in fluid communication with a U-shaped coupler 20 (FIG. 2). The U-shaped coupler 20 can be fluidly coupled to the intake manifold 18 to facilitate fluid communication between the outlet port 16b of the snorkel 16 and the intake manifold 18. Though the snorkel 16 is shown to comprise a tubular structure that is configured in such a manner to facilitate fluid communication between an air box and an underlying engine, it will be appreciated that a snorkel can assume any of a variety of other configurations that facilitate routing of ambient air to an engine.

Figure 4:
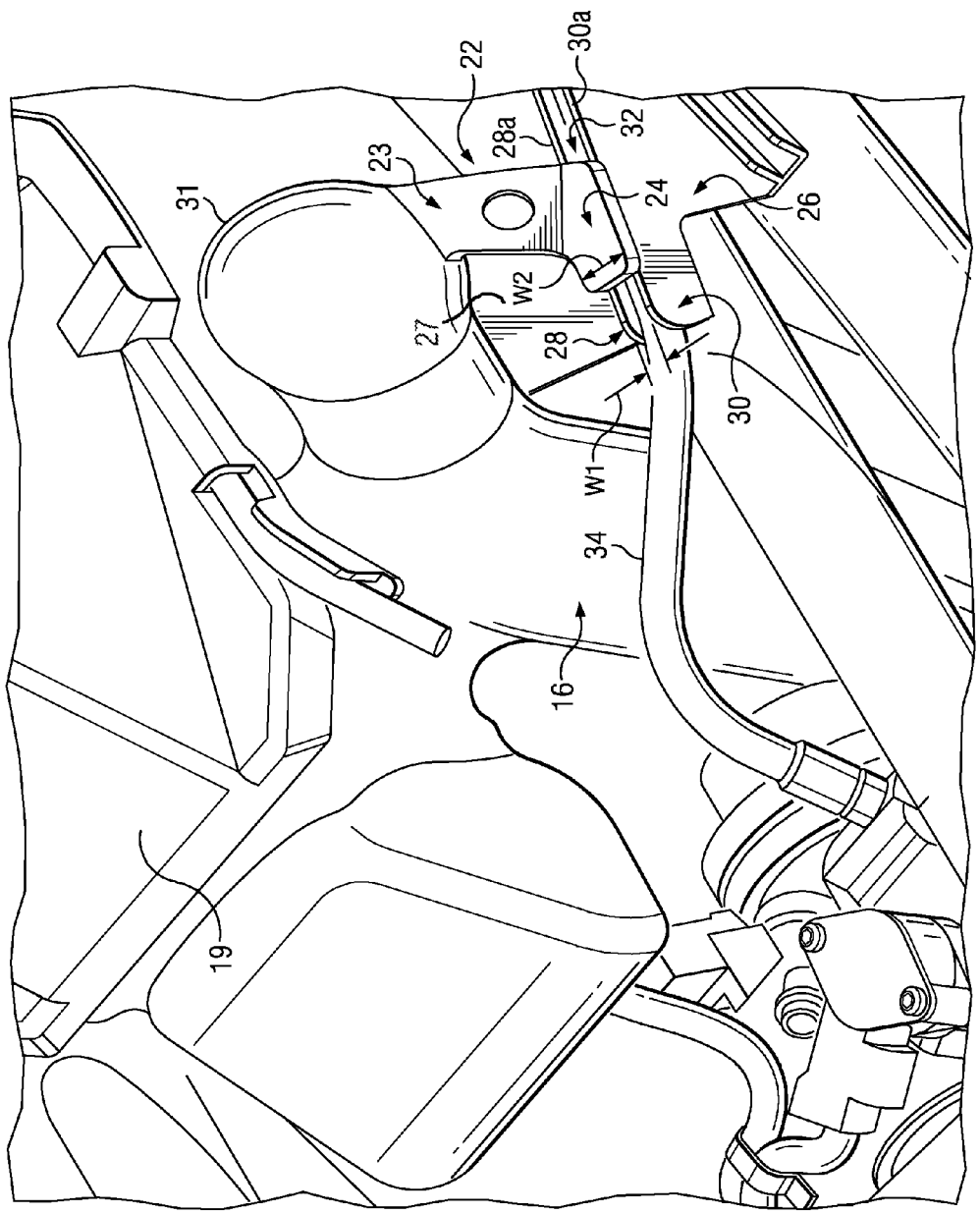
FIG. 4 is a right rear perspective view depicting the lid and the snorkel of FIG. 2 together with a panel and various other vehicular components, the panel including a first side wall and a second side wall that cooperate to define a channel, wherein the snorkel includes an attachment tab having a foot portion that overlies the first and second side walls to constrain a cable within the channel.
Figure 5:
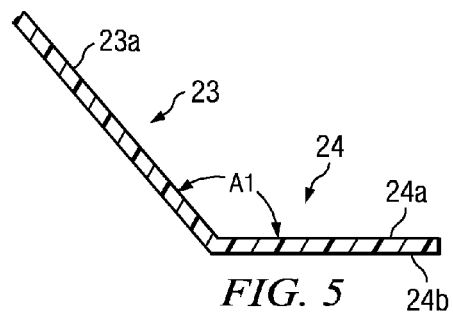
FIG. 5 is a cross-sectional view depicting the attachment tab of the snorkel taken along the line 5-5 in FIG. 3.

As illustrated in FIGS. 3-4, the snorkel 16 can include an attachment tab 22 having a leg member 23 and a foot portion 24. As shown in FIG. 5, the leg member 23 can include a leg surface 23a and the foot portion 24 can include an upper surface 24a and a lower surface 24b. The foot portion 24 can extend from the leg member 23 such that the leg surface 23a and the upper surface 24a form an obtuse angle A1. In one embodiment, the obtuse angle A1 can be between about 120 degrees and about 150 degrees. In another embodiment, the obtuse angle A1 can be about 135 degrees.

As described herein, the vehicular engine assembly 12 can include a panel associated with the engine 14 and configured to support an elongated member. In one embodiment, as illustrated in FIG. 4, the panel can be a heat shield 26 configured to protect certain components from radiant heat emitted from the engine 14 and/or other heat emitting components. The heat shield 26 is shown to include an upper surface 27, a first side wall 28, and a second side wall 30. The first and second side walls 28, 30 can extend substantially upwardly from the upper surface 27 and can cooperate to define a channel 32. It will be appreciated that the heat shield 26 can assume any of a variety of suitable shapes and sizes which define a channel.

The channel 32 can be configured to receive an elongated member, such as a cable 34 shown in FIG. 4, for example. The cable 34 can be routed between the first and second side walls 28, 30 such that a portion of the cable 34 is disposed within the channel 32. The first and second side walls 28, 30 are depicted in FIG. 4 to be substantially parallel with each other. However, it will be appreciated that a first side wall and/or second side wall can be configured differently, and can be flat, curved, or can assume any of a variety of suitable shapes that at least partially define a channel for receiving an elongated member. In one embodiment, the channel 32 can be substantially U-shaped, but in other embodiments, the channel 32 can be any of a variety of suitable shapes that are suitable to receive and support a cable.

In one embodiment, the cable 34 can comprise a throttle cable which can be routed from a throttle control (not shown) on a handlebar assembly 35 (FIG. 1) over the heat shield 26, within the channel 32, and to a throttle mechanism (i.e., a butterfly valve) of the engine 14. In other embodiments, suitable elongated members might comprise, for example, a Bowden-type cable, a conduit, a harness, a pipe, a pipeline, a tube, a wire, or any of a variety of other elongated members and combinations thereof.

As illustrated in FIG. 4, the snorkel 16 can be positioned in such a manner that the foot portion 24 is adjacent to and overlies at least a portion of each of the first and second side walls 28, 30. The foot portion 24 can cooperate together with the first and second side walls 28, 30 to constrain the cable 34 within the channel 32. In one embodiment, the lower surface 24b of the foot portion 24 can be in contact with respective upper surfaces 28a, 30a of the first and second side walls 28, 30 such that the foot portion 24 effectively blocks an upper area of the channel 32 to prevent the cable from inadvertently escaping the channel 32. The upper surfaces 28a, 30a and the lower surface 24b can each be substantially planar and, when the lower surface 24 contacts the respective upper surfaces 28a, 30a of the first and second side walls 28, 30, the lower surface 24b of the foot portion 24 can be substantially perpendicular to each of the first and second side walls 28, 30. In other embodiments, the foot portion 24 might instead be spaced from each of the first and second side walls 28, 30 while still remaining proximate enough to the first and second side walls 28, 30 to facilitate constrainment of the cable 34 within the channel 32. In such an embodiment, the foot portion 24 can be spaced from the first and second side walls 28, 30 by a distance that is less than an outer diameter of the cable 34 such that the gap between the foot portion 24 and the first and second side walls 28, 30 is too small to permit passage of the cable 34.

The snorkel 16 can be coupled to the frame 11, or another portion of the vehicular engine assembly 12 or the vehicle 10, with releasable fasteners (not shown) or any of a variety of suitable alternative fastening arrangements. Prior to installation of the snorkel 16, the cable 34 can be routed through the channel 32 and sandwiched between the first and second side walls 28, 30 to temporarily hold the cable 34 in place. The snorkel 16 can then be installed over the heat shield 26 which can provide the foot portion 24 over the channel 32. When the snorkel 16 is secured in place, the foot portion 24 can be aligned over the channel 32 and held in place to constrain the cable 34 within the channel 32, as shown in FIG. 4. In one embodiment, the foot portion 24 can be arranged to contact the first and second side walls 28, 30 when the snorkel 16 is loosely fitted onto the frame 11. As the snorkel 16 is secured into place (e.g., through tightening of the fasteners), the foot portion 24 can be pressed downwardly against, and into frictional engagement with, the first and second side walls 28, 30. In such an embodiment, the foot portion 24 can impart enough force onto the first and second side walls 28, 30 to hold the foot portion 24 in place without requiring additional fastening of the foot portion 24 to the first and second side walls 28, 30 (e.g., with fasteners, through plastic welding, or adhesive). In another embodiment, the first and second side walls 28, 30 can define respective notched portions (not shown). In such an embodiment, when the snorkel 16 is installed, the foot portion 24 can be cradled by the notched portions to hold the foot portion 24 in place.

As illustrated in FIG. 4, the first and second side walls 28, 30 can cooperate to define a channel width W1 and the foot portion 24 can have a width W2. In one embodiment, as illustrated in FIG. 4, the width W2 of the foot portion 24 can be greater than the channel width W1 such that the foot portion 24 overlies the channel 32. In another embodiment, the width W2 of the foot portion 24 can be less than the channel width W1 such that the foot portion 24 can fit between the first and second side walls 28, 30 and within the channel 32. In such an embodiment, the foot portion 24 can be configured to extend into the channel to effectively constrain and accommodate a variety of different cable sizes. The first and second side walls 28, 30 can cooperate to define a channel length and in one embodiment can be configured such that the channel width W1 is substantially constant over the channel length. It will be appreciated that first and second side walls can define a channel having any of a variety of configurations that cooperate with a foot portion of a snorkel to constrain an elongated member. While the leg surface 23a and the top and bottom surfaces 24*a*, 24*b* of the foot portion 24 are shown in FIGS. 3-5 to be substantially planar, it will be appreciated that the leg member 23 and/or the foot portion 24 can be curved, bent, or can assume any of a variety of suitable shapes that facilitate cooperation with side walls to constrain a cable within a channel. Similarly, while the attachment tab 22 is shown in FIGS. 3-4 to extend from an elbow 31 of the snorkel 16, it will be appreciated that an attachment tab can extend from any portion of a snorkel such that the attachment tab can cooperate with first and second side walls to constrain an elongated member within a channel defined by the first and second side walls.

Figure 6:
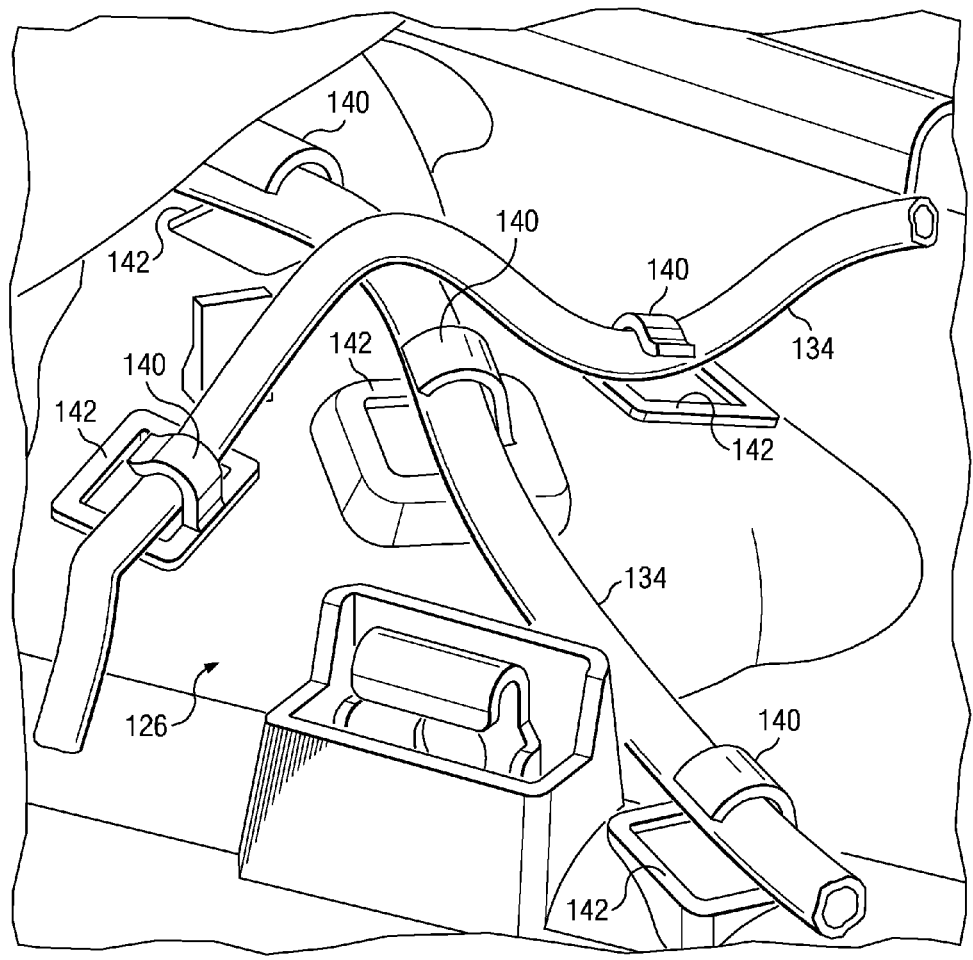
FIG. 6 is a perspective view depicting a portion of a conventional vehicular engine assembly.

FIG. 6 illustrates a portion of a conventional vehicular engine assembly. In the embodiment shown in FIG. 6, a panel 126 includes a plurality of tabs 140 each having a corresponding underlying base portion 142. A pair of cables 134 can be routed over the panel 126 and secured thereto by the tabs 140. Though the tabs 140 can facilitate routing of the cables 134, contact between the cables 134 and the tabs 140 and/or the base portions 142 can cause chafing and premature failure of the cables 134 which can require frequent cable maintenance and/or cable replacement. The tabs 140 can be susceptible to failure which can free the cables 134 from the panel 126 thereby increasing the risk of chafing against the panel 126 and/or separation of the cable from its coupling location.

Conversely, the snorkel 16 and the heat shield 26 depicted in FIGS. 1-5 can be effective to constrain the cable 34 or other elongated member in a manner that can prolong the integrity of the cable 34. For example, the U-shape of the channel 32 can conform to the overall shape of the cable 34 and can include a support surface that is effective to prevent abrading and/or chafing of the cable 34. The elongated nature of the channel 32 can also achieve consistent and direct routing of the cable 34 around the engine 14, and with fewer attachment points and improved ease of installation, as compared to the conventional arrangement of FIG. 6.

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A vehicular engine assembly comprising:
   an engine;
   a panel associated with the engine, the panel comprising a panel surface, a first side wall, and a second side wall, wherein the first and second side walls extend substantially upwardly from the panel surface and define a channel that is configured to receive an elongated member;
   an air box configured to receive ambient air; and
   a snorkel in fluid communication with the air box and configured to route the ambient air from the air box to the engine, the snorkel comprising an attachment tab, the attachment tab comprising a leg member and a foot portion, the foot portion being adjacent to and overlying at least a portion of each of the first and second side walls;
   wherein the attachment tab is external to, and spaced from, the air box; and
   wherein the foot portion cooperates with the first and second side walls to at least partially constrain the elongated member within the channel.

2. The vehicular engine assembly of claim 1 wherein the panel is a heat shield.

3. The vehicular engine assembly of claim 1 wherein the elongated member further comprises a cable routed between the first and second side walls and with at least a portion of the cable disposed within the channel, wherein the first and second side walls and the foot portion cooperate to constrain the cable within the channel.

4. The vehicular engine assembly of claim 1 wherein the first and second side walls cooperate to define a channel width and the foot portion has a width greater than the channel width.

5. The vehicular engine assembly of claim 1 wherein the foot portion has a substantially planar lower surface which is substantially perpendicular to each of the first and second side walls.

6. A vehicle comprising the vehicular engine assembly of claim 1.

7. The vehicular engine assembly of claim 1 wherein the elongated member is a cable.

8. The vehicular engine assembly of claim 3 wherein the foot portion contacts each of the first and second side walls.

9. The vehicular engine assembly of claim 8 wherein the foot portion is downwardly biased onto the first and second side walls by the snorkel.

10. The vehicular engine assembly of claim 9 wherein the foot portion is detached from the first and second side walls.

11. The vehicular engine assembly of claim 4 wherein the first and second side walls are substantially parallel with one another.

12. The vehicular engine assembly of claim 4 wherein the first and second side walls cooperate to define a channel length and the channel width is substantially constant over the channel length.

13. The vehicular engine assembly of claim 5 wherein the leg member comprises a leg surface, the foot portion comprises an upper surface, and the foot portion extends from the leg member such that the leg surface and the upper surface form an obtuse angle.

14. The vehicle of claim 6 wherein the vehicle comprises a saddle-type vehicle.

15. A vehicular engine assembly comprising:
    an engine;
    a panel associated with the engine, the panel comprising a panel surface, a first side wall, and a second side wall, wherein the first and second side walls extend substantially upwardly from the panel surface and define a channel that is configured to receive an elongated member;
    an air box configured to receive ambient air; and
    a snorkel in fluid communication with the air box and configured to route the ambient air from the air box to the engine, the snorkel comprising an attachment tab, the attachment tab comprising a leg member and a foot portion, the foot portion being adjacent to and overlying at least a portion of each of the first and second side walls;
    wherein the foot portion cooperates with the first and second side walls to at least partially constrain the elongated member within the channel; and
    wherein the foot portion is detached from the first and second side walls.

16. The vehicular engine assembly of claim 15 wherein the foot portion is downwardly biased onto the first and second side walls by the snorkel.

17. The vehicular engine assembly of claim 15 wherein the leg member comprises a leg surface, the foot portion comprises an upper surface, and the foot portion extends from the leg member such that the leg surface and the upper surface form an obtuse angle.

18. The vehicle of claim 15 wherein the foot portion comprises a substantially planar lower surface which is substantially perpendicular to each of the first and second side walls.

19. A vehicular engine assembly comprising:
   an engine;
   a panel associated with the engine, the panel comprising a panel surface, a first side wall, and a second side wall, wherein the first and second side walls extend substantially upwardly from the panel surface and define a channel;
   an elongated member received within the channel;
   an air box configured to receive ambient air; and
   a snorkel in fluid communication with the air box and configured to route the ambient air from the air box to the engine, the snorkel comprising an attachment tab, the attachment tab comprising a leg member and a foot portion, the foot portion being adjacent to and overlying at least a portion of each of the first and second side walls, the foot portion;
   wherein the foot portion cooperates with the first and second side walls to at least partially constrain the elongated member within the channel; and
   wherein the foot portion is spaced from each of the first and second side walls by a distance that is less than the outer diameter of the elongated member.

20. The vehicular engine assembly of claim 19 wherein the elongated member is a cable.

* * * * *